United States Patent
Moon et al.

(10) Patent No.: US 8,890,647 B2
(45) Date of Patent: Nov. 18, 2014

(54) MAGNETIC LAYER COMPOSITION, MULTILAYER TYPE COIL COMPONENT, AND METHOD FOR MANUFACTURING THE SAME

(75) Inventors: Byeong Cheol Moon, Seoul (KR); So Yeon Song, Gyeonggi-do (KR); Soo Hwan Son, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 87 days.

(21) Appl. No.: 13/483,584

(22) Filed: May 30, 2012

(65) Prior Publication Data
US 2013/0009742 A1   Jan. 10, 2013

(30) Foreign Application Priority Data
Jul. 8, 2011   (KR) .................. 10-2011-0067894

(51) Int. Cl.
*H01F 27/24* (2006.01)
(52) U.S. Cl.
USPC ........................................................ 336/233
(58) Field of Classification Search
USPC .............................. 336/200, 232–234
See application file for complete search history.

(56) References Cited

U.S. PATENT DOCUMENTS

| | | | |
|---|---|---|---|
| 6,292,139 B1 * | 9/2001 | Yamamoto et al. | .... 343/700 MS |
| 2007/0063623 A1 * | 3/2007 | Nakao et al. | ................. 310/366 |

FOREIGN PATENT DOCUMENTS

KR    10-2007-0036666 A    4/2007

* cited by examiner

*Primary Examiner* — Tuyen Nguyen
(74) *Attorney, Agent, or Firm* — McDermott Will & Emery LLP

(57) ABSTRACT

Disclosed herein are a multilayer type inductor including a magnetic layer composition including NiZn ferrite, a multilayer type coil component including a magnetic layer prepared therefrom, and a method for manufacturing the same. According to the present invention, a copper electrode can be used as an internal electrode of a multilayer type coil product, by including NiZn ferrite in the magnetic layer. As copper is used for the internal electrode, material costs can be significantly reduced. Furthermore, the present invention can improve the maximum saturation magnetization value against the NiCuZn ferrite by about 10%, due to exclusion of Cu having weak magnetism, and can be more desirably used in a product employing high current.

7 Claims, 3 Drawing Sheets

- PRIOR ART -

MAGNETIC LAYER COMPOSITION, MULTILAYER TYPE COIL COMPONENT, AND METHOD FOR MANUFACTURING THE SAME

CROSS REFERENCE(S) TO RELATED APPLICATIONS

This application claims the benefit under 35 U.S.C. Section 119 of Korean Patent Application Serial No. 10-2011-0067894, entitled "Magnetic Layer Composition, Multilayer Type Coil Component, and Method for Manufacturing the Same" filed on Jul. 8, 2011, which is hereby incorporated by reference in its entirety into this application.

BACKGROUND OF THE INVENTION

1. Technical Field

The present invention relates to a magnetic layer composition including NiZn ferrite, a multilayer type coil component including a magnetic layer prepared therefrom, and a method for manufacturing the same.

2. Description of the Related Art

A multilayer type chip inductor, a multilayer type chip bead, and a module type product in which an embedded coil is contained, employ a NiCuZn ferrite material as a body material. In addition, since a conductor resistance has a large effect on inductance characteristics of the product (quality factor Q, thermal characteristics), 100% silver (Ag) is used for an internal electrode. Therefore, in order to allow the NiCuZn ferrite material to be sintered at a temperature of 960☐ or lower, which is a melting point of silver, powder characteristics thereof or other additives are being developed.

Meanwhile, silver for the internal electrode, which is a noble metal, is not oxidized at a high temperature, and thus, a de-binder process (removing organic substance from a half-finished product at a high temperature) and a sintering process may be performed under a general atmosphere.

Meanwhile, the silver used for the internal electrode has the lowest resistivity as compared with other metals, and thus has many advantages. However, silver is expensive because it is a noble metal, and temporal price variation thereof is very large. Recently, a great increase in the price of silver imposes a heavy burden on product costs. Several kinds of metals generally usable for the internal electrode, except this silver, are shown in Table 1. Except copper (Cu), most have very large resistivity as compared with silver, and thus, they are not suitable as a conductor for a general coil component except for special usages regardless of low efficiency. Furthermore, copper is also easily oxidized, and thus, is not still used.

TABLE 1

| | Resistivity (×1E-8 Ω·m, 298K) | Density (g/cc) | Melting point (°C.) | Coefficient Of thermal Expansion (×10E-6/K) | Notes |
|---|---|---|---|---|---|
| Ag | 1.59 | 10.5 | 961 | 19.2 | |
| Au | 2.35 | 19.3 | 1063 | 14.2 | |
| Pt | 10.6 | 21.4 | 2045 | 9 | |
| Pd | 10.8 | 12 | 1825 | 11.2 | |
| Cu | 1.7 | 8.96 | 1083 | 16.5 | |
| Ni | 6.84 | 8.9 | 1453 | 13.3 | Magnetic material |
| Mo | 5.2 | 10.2 | 2610 | 5.43 | |
| W | 5.65 | 19.3 | 3410 | 4.59 | |

A procedure for forming a coil in a general multilayer type coil element of the related art is shown in FIG. 1. Referring to the drawing, the multilayer type coil element is manufactured by forming a via hole 20 for interlayer interaction in a ceramic sheet 10 including organic substance, which is prepared through tape molding, and then printing (commonly, by using screen printing) a silver internal conductive paste (internal electrode 30) on the ceramic sheet through the via hole 20 to form a pattern. The patterns thus printed are laminated in alignment with accurate positions, and connection of the silver paste through the via hole is performed, thereby entirely forming a coil. The coil type half-finished product is cut into separate chips, and hot air is applied thereto under the atmosphere to remove organic substance (de-binder). The resulting product is fired in a furnace at a high temperature of 800☐ or higher, thereby forming a chip inductor.

Meanwhile, when copper is used as an internal conductor, sintering under a reducing ambience with less oxygen needs to be performed in order to prevent the copper from being oxidized. However, at this time, the NiCuZn ferrite, which is a general material for the multilayer type coil element, has poor resistance to reduction, and thus, reduction of the material causes breakage of structure, deterioration in magnetic characteristics, and prevention of densification by sintering. These results can be confirmed from X-ray diffraction as shown in FIG. 2.

FIG. 2 shows an X-ray diffraction pattern of NiCuZn ferrite sintered under a reducing ambience, and it can be seen that respective materials constituting the ferrite all were reduced to exhibit no peaks, and only peaks of other constituent components except for the ferrite were observed.

Therefore, it is necessary to develop new materials that substitute for silver, which is a noble metal, as the internal conductor, and methods for utilizing the existing materials as the internal conductor.

SUMMARY OF THE INVENTION

An object of the present invention is to provide a multilayer type coil component, which includes a magnetic layer having a cheap material capable of being substituted for silver (Ag), which is a noble metal, as an internal conductor.

An object of the present invention is also to provide a magnetic layer composition for the multilayer type coil component.

An object of the present invention is also to provide a method for manufacturing a multilayer type coil component.

According to an exemplary embodiment of the present invention, there is provided a multilayer type coil component including a magnetic layer composition including NiZn ferrite, with exclusion of copper.

The magnetic layer may include an internal electrode.

The internal electrode may be made by using Cu.

The Cu used in the internal electrode may have a particle size of 0.1 to 3 μm.

The internal electrode may further include a shrinkage inhibitor.

The shrinkage inhibitor may be at least one selected from the group consisting of zirconia, alumina, silica, and a material the same as that of the magnetic layer.

According to another exemplary embodiment of the present invention, there is provided a magnetic layer composition including 45 to 49 mol % of iron oxide in terms of $Fe_2O_3$, 9 to 50 mol % of nickel oxide in terms of NiO, and the residual zinc oxide.

The magnetic layer composition may be characterized in that copper (Cu) is not substantially included.

Each of the materials constituting the magnetic layer composition may have a specific surface area of 6 to 12 $m^2/g$.

The magnetic layer may further include a sintering additive in order to improve the sintering property.

The sintering additive may be glass or $Bi_2O_3$.

According to another exemplary embodiment of the present invention, there is provided a method for manufacturing a multilayer type coil component, including: forming a magnetic layer including NiZn ferrite, with exclusion of copper; forming green sheets from the magnetic layer; printing internal electrodes on the green sheets respectively, and then laminating the green sheets; and sintering the laminated green sheets.

The internal electrode may be made of Cu.

The sintering may be performed under the oxidizing ambience condition at the initial stage and be performed under the reducing ambience condition at the later stage.

A temperature for the sintering may be a melting point of the internal electrode or lower.

DESCRIPTION OF THE PREFERRED EMBODIMENTS

Figure 1:
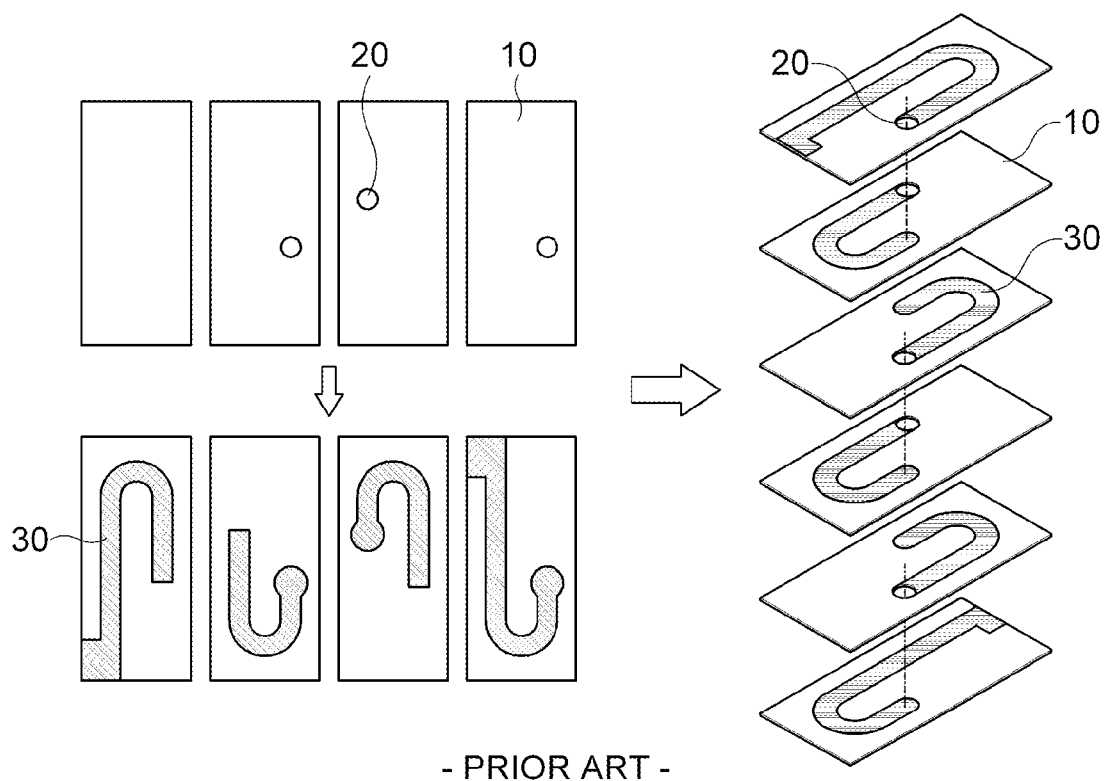
FIG. 1 shows a method for forming a coil of a multilayer type chip inductor of the related art.
Figure 2:
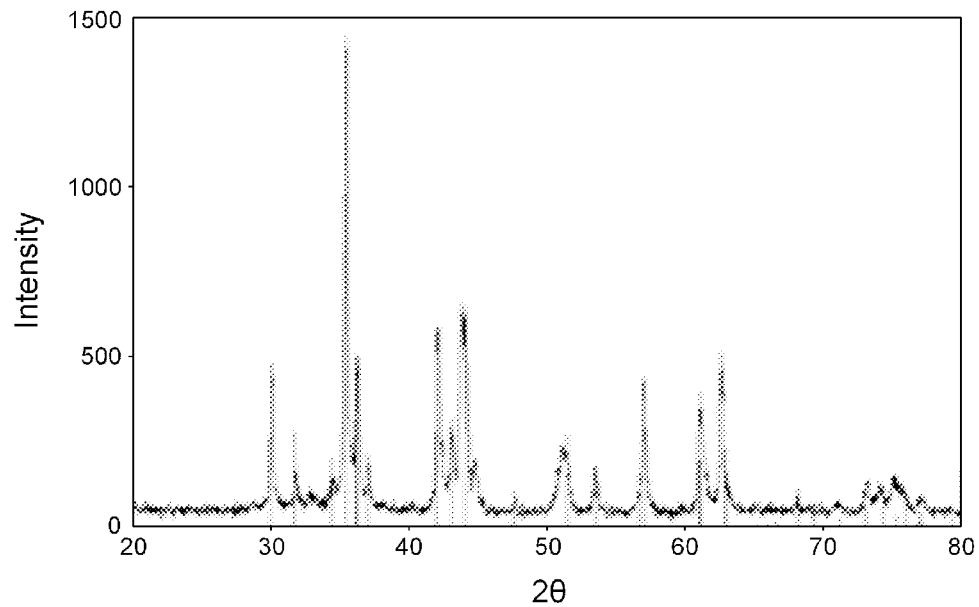
FIG. 2 shows an X-ray diffraction pattern result of NiCuZn ferrite sintered under a reducing ambience.

Hereinafter, the present invention will be described in more detail.

Terms used in the present specification are for explaining the embodiments rather than limiting the present invention. Unless explicitly described to the contrary, a singular form includes a plural form in the present specification. Also, used herein, the word "comprise" and/or "comprising" will be understood to imply the inclusion of stated shapes, figures, constituents, steps, operations and/or elements but not the exclusion of any other shapes, figures, constituents, steps, operations and/or elements.

The present invention is directed to an NiZn ferrite magnetic layer composition, a multilayer type coil component including a magnetic layer prepared by using the magnetic layer composition, and a method for manufacturing the multilayer type coil component.

The multilayer type coil component according to the present invention employs a ferrite material capable of being sintered under the reducing ambience in which a copper electrode is not oxidized, in order to use a copper as an internal electrode. Specifically, the multilayered coil component according to the present invention includes a magnetic layer using NiZn ferrite, in which Cu having poor resistance to reduction is not included.

However, the NiZn ferrite has a sintering temperature of 1100☐, or higher, which is very high, and thus, it is impossible to use the copper electrode, which has a melting point of 1080☐. Therefore, in the present invention, in order to lower the sintering temperature of NiZn ferrite, the amount of iron oxide, as a constituent component, is decreased from 50 mol % to 49 mol % or less in view of a stoichiometric composition.

In other words, the magnetic layer composition of the multilayer type inductor according to the present invention preferably includes 45 to 49 mol % of iron oxide in terms of $Fe_2O_3$, 9 to 50 mol % of nickel oxide in terms of NiO, and the residual zinc oxide.

Therefore, if the content of the iron oxide is above 49 mol % in the magnetic layer composition, the sintering temperature thereof is very high, copper is not usable as the internal electrode. Whereas, if the content of iron oxide is below 45 mol %, magnetic property is deteriorated, resulting in undesirable effects.

Also, in the magnetic layer composition, 9 to 50 mol % of nickel oxide is included in terms of NiO. If the content of the nickel oxide is below 9 mol %, magnetic property is lost at room temperature, and if the content of the nickel oxide is above 50 mol %, magnetic permeability is deteriorated, resulting in undesirable effects.

The magnetic layer composition according to the present invention is NiZn ferrite, and is characterized in that copper (Cu) is not substantially included.

In addition, in order to increase a surface energy, which is a driving force of densification during sintering, a particle size of a powder is decreased, thereby largely increasing a specific surface area (surface area per unit mass). That is to say, each of the materials constituting the magnetic layer composition preferably has a specific surface area of 6 to 12 $m^2/g$. If the specific surface area of each material is below 6 $m^2/g$, sintering property thereof is deteriorated, and thus, densification does not occur at a temperature of a melting point of Cu or lower. Whereas, if the specific surface area thereof is above 12 $m^2/g$, residual stress is increased due to increase of shrinkage rate, and thus, magnetism is deteriorated.

As such, the sintering temperature of the magnetic layer is lowered to below 1050☐ by regulating the composition of the magnetic layer and specifying the specific surface area, and thus, copper can be used as the internal electrode.

Meanwhile, in the present invention, copper can be used for the internal electrode by changing materials for the magnetic layer.

As for the copper internal electrode, in conventional metal sintering, when the melting point is taken as an absolute temperature, an appropriate sintering temperature thereof is about 0.7 Tm. However, a copper powder used in the multilayer type coil element has a size below several μm, which is a very fine grain, and co-fired inside a ceramic material which is difficult to sinter, thereby exhibiting a relatively fast shrinkage behavior as compared with the ceramic material. (FIG. 3)

This difference of shrinkage behavior between the copper internal electrode and the ceramic material causes damage to the products such as cracks in a producing process of the products, and thus, the difference of shrinkage needs to be minimized.

Figure 3:
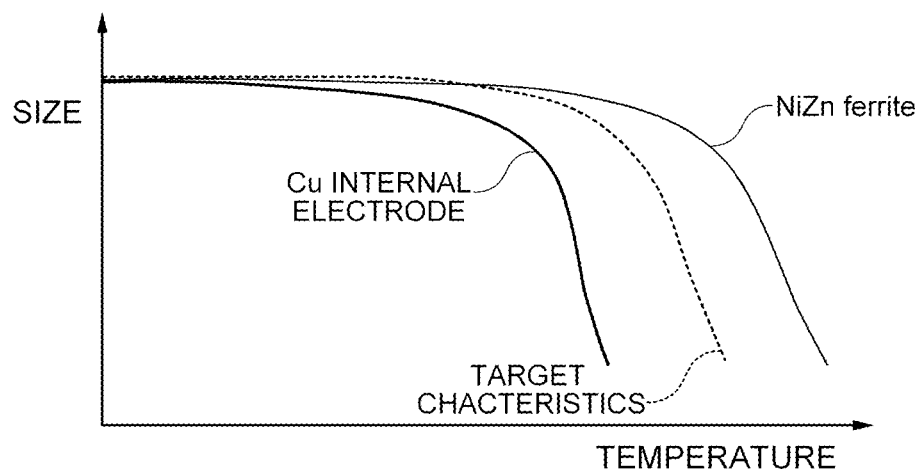
FIG. 3 is a graph showing a difference of shrinkage behavior between a copper internal electrode and a ceramic material.

Therefore, in the present invention, the copper internal electrode and the ferrite magnetic layer exhibit the same level of shrinkage behavior at a target characteristic point, as shown in FIG. 3, by delaying the shrinkage behavior of the copper internal electrode and improving the shrinkage behavior of the ferrite magnetic layer.

In order to delay the shrinkage behavior, fine grain type ceramic particles may be included in a paste for the copper internal electrode, as shrinkage inhibitor capable of inhibiting shrinkage between copper particles.

The shrinkage inhibitor is at least one selected from the group consisting of zirconia, alumina, silica, and a material that is the same as that of the magnetic layer, but not limited thereto. The ceramic particle, as the shrinkage inhibitor, is a nonconductor particle, and decreases a cross-sectional area of the conductor inside the electrode, thereby increasing an inside resistance. Therefore, a fine grain type additive needs to be used in the least minimal amount. That is to say, the additive is preferably used in a small amount within 1 wt % against the particle content of the internal electrode.

Also, Cu used in the internal electrode has a particle size of 0.1 to 3 μm, which is preferable in realizing from a small-sized thin film type electrode to a large-sized thick film type electrode.

The magnetic layer composition of the present invention may further include a sintering additive in order to conform the sintering behavior to the copper internal electrode through improvement of the sintering property. The sintering additive may be made of glass and $Bi_2O_3$, but is not limited thereto.

Therefore, the NiZn ferrite according to the present invention can cover most magnetic permeability ranges currently used in the multilayer type coil element by regulating a ratio between nickel and zinc.

In the present invention, the NiZn ferrite, the sintering additive, and the like, constituting the magnetic layer composition, are mixed at a predetermined ratio, and then a binder, a solvent, and an additive are mixed therewith, and then the resulting mixture is used to manufacture a film type green sheet having a predetermined thickness.

The binder is used to impart printability, and for example, ethylcellulose, acrylic, polyvinyl butyral, polyvinyl alcohol, nitrocellulose, phenol, urethane, polyester, rosin, melamine, and urea resin may be used alone or mixedly. They each may be contained within the content level, which is generally used in the magnetic layer composition, but not particularly limited.

In addition, the solvent may use dihydro-terpineol, dihydro-terpinyl acetate, buthyl carbitol, buthyl carbititol acetate, texanol, mineral sprit, alcohol-based solvent such as octanol; ketone-based solvent; cellosolve-based solvent; ester-based solvent, and ether-based solvent, alone or mixedly, and the content thereof may be within the content level which is generally used in the magnetic layer composition, but not particularly limited.

Hereinafter, a method for manufacturing a multilayer type coil component according to the present invention will be described in detail. First, a NiZn ferrite magnetic layer composition, which does not include copper, is prepared, and then used to manufacture green sheets. The magnetic layer composition is described as above in detail.

Second, an internal electrode is printed on each of the green sheets, which are then laminated. As the internal electrode, Cu may be preferably used.

Then, the laminated sheets are sintered, thereby manufacturing a multilayer type coil component according to the present invention. In particular, in the present invention, sintering is preferably performed under the oxidizing condition at the initial stage and under the reducing condition at the later stage.

That is to say, the reducing ambience is not maintained throughout the entire sintering procedure, Sintering is performed at the initial stage under the oxidizing ambience in which only excessive oxidation is suppressed by a nitrogen ambience. Then, sintering is performed at the later stage again under the reducing ambience. Under the reducing ambience, the fine grain type copper oxide particles are reduced to a copper (Cu) metal, which is absorbed onto the copper electrode, as a resultant, thereby acting as a conductor.

The temperature at the time of sintering may be at a temperature of 1080□ or lower, which is a melting point of the copper internal electrode, and preferably 1050□ or lower. According to the method of the present invention, it is possible to manufacture a product without defects by controlling the shrinkage behavior of the copper internal electrode.

Hereinafter, an exemplary embodiment of the present invention will be described in detail. The following examples are only for illustrating the present invention, and the scope of the present invention should not be construed as being limited by these examples. In addition, specific compounds are used in the following examples, but it is obvious to those skilled in the art that equivalents thereof can exhibit the same or similar degrees of effects.

Example 1

A fine grain type NiZn ferrite powder having a specific surface area of 10 $m^2/g$, which was synthesized by using 48 mol % of iron oxide, 26 mol % of nickel oxide, and 26 mol % of zinc oxide, as raw materials, was first prepared in a toroidal type. This was sintered under the reducing ambience at 1000□ in which Cu is not oxidized. Measurement of magnetic characteristics confirmed that magnetic permeability thereof was 120, and X-ray diffraction analysis confirmed that the material crystalline structure was not changed.

The magnetic layer composition was dispersed by using a ball mill, and mixed with a PVB-based binder to manufacture a ceramic sheet of 40 μm. The manufactured ceramic sheet was cut into individual sheets each having a predetermined size, and then via holes of 200 μm were formed in the individual sheets and patterns for a product of a predetermined size were formed in alignment with the via holes through screen combination, thereby printing a paste for the Cu internal electrode. The printed sheets were orderly laminated, thereby forming a 4, 5-turn coil. This was compressed at a high temperature and a high pressure, to be formed into a single body, which was then cut into individual chips and the individual chips were separated.

The separated chips, in order to suppress oxidation of copper electrodes, were maintained at predetermined time/temperature under the nitrogen ambience, thereby removing a large amount of organic substance, and then sintered under the nitrogen-oxygen ambience controlled according to the stages, thereby forming a dense sintered body.

The sintered chip was polished by using a barrel to ensure exposure of a surface of the internal electrode, and then a paste for an external electrode, which contains copper as a main component, like the internal electrode, was coated, followed by drying. Then, the external electrode was sintered in a sintering furnace of which ambience was controlled, thereby allowing electric connection with an external part. In this state, electric characteristics of the product can be measured. Then, Ni and Sn plating was performed, thereby completing the chips.

Experimental Example 1

Measurement of Electric Characteristics

Figure 4:
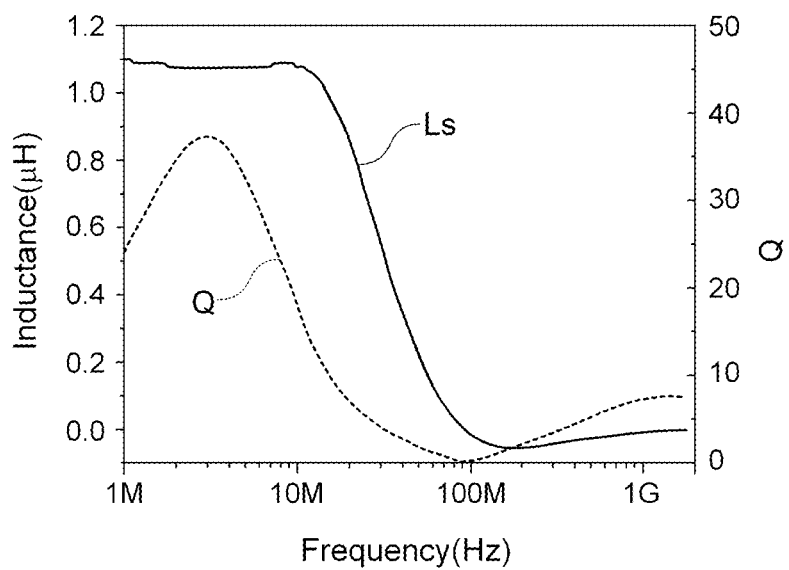
FIG. 4 is a graph showing an electric characteristic of a chip component according to Example 1 of the present invention.

Electric characteristics of the chip obtained from Example 1 were measured, and the measurement results were shown in FIG. 4.

Then, as shown in FIG. 4, it was observed that the multilayer type chip component of the present invention, which was manufactured by using NiZn ferrite with exclusion of copper for a composition for the magnetic layer and using copper for the internal electrode, has similar electric characteristics to the chip component manufactured from the conventional ferrite magnetic layer composition.

These results confirmed that the multilayer type chip component according to the present invention could substitute for the ferrite magnetic layer and the silver electrode of the related art.

As set forth above, according to the present invention, a copper metal can be used for an internal electrode of a multilayer type coil product, by including NiZn ferrite in the magnetic layer. As the copper is used for the internal electrode, material costs can be significantly reduced.

Furthermore, the present invention can improve the maximum saturation magnetization value against the NiCuZn ferrite by about 10%, due to exclusion of Cu having weak magnetism, and can be more desirably used in a product employing high current.

While the present invention has been shown and described in connection with the embodiments, it will be apparent to those skilled in the art that modifications and variations can be made without departing from the spirit and scope of the invention as defined by the appended claims.

What is claimed is:

1. A multilayer type coil component comprising a magnetic layer prepared from a magnetic layer composition including NiZn ferrite, wherein the magnetic layer composition includes 45 to 49 mol % of iron oxide in terms of $Fe_2O_3$, 9 to 50 mol % of nickel oxide in terms of NiO, and the residual zinc oxide, with exclusion of copper.

2. The multilayer type coil component according to claim 1, wherein the magnetic layer includes an internal electrode.

3. The multilayer type coil component according to claim 2, wherein the internal electrode is made of Cu.

4. The multilayer type coil component according to claim 2, wherein the Cu has a particle size of 0.1 to 3 μm.

5. The multilayer type coil component according to claim 2, wherein the internal electrode further includes a shrinkage inhibitor.

6. The multilayer type coil component according to claim 5, wherein the shrinkage inhibitor is at least one selected from the group consisting of zirconia, alumina, silica, and a material the same as that of the magnetic layer.

7. The multilayer type coil component according to claim 2, wherein the multilayer type coil component is at least one selected from the group consisting of a multilayer type chip inductor, a multilayer type chip bead, and a module type product.

* * * * *